Nov. 7, 1967  K. M. ALLEN ETAL  3,351,181
CONVEYORS OF GRANULAR MATERIAL
Filed Dec. 23, 1965  3 Sheets-Sheet 1
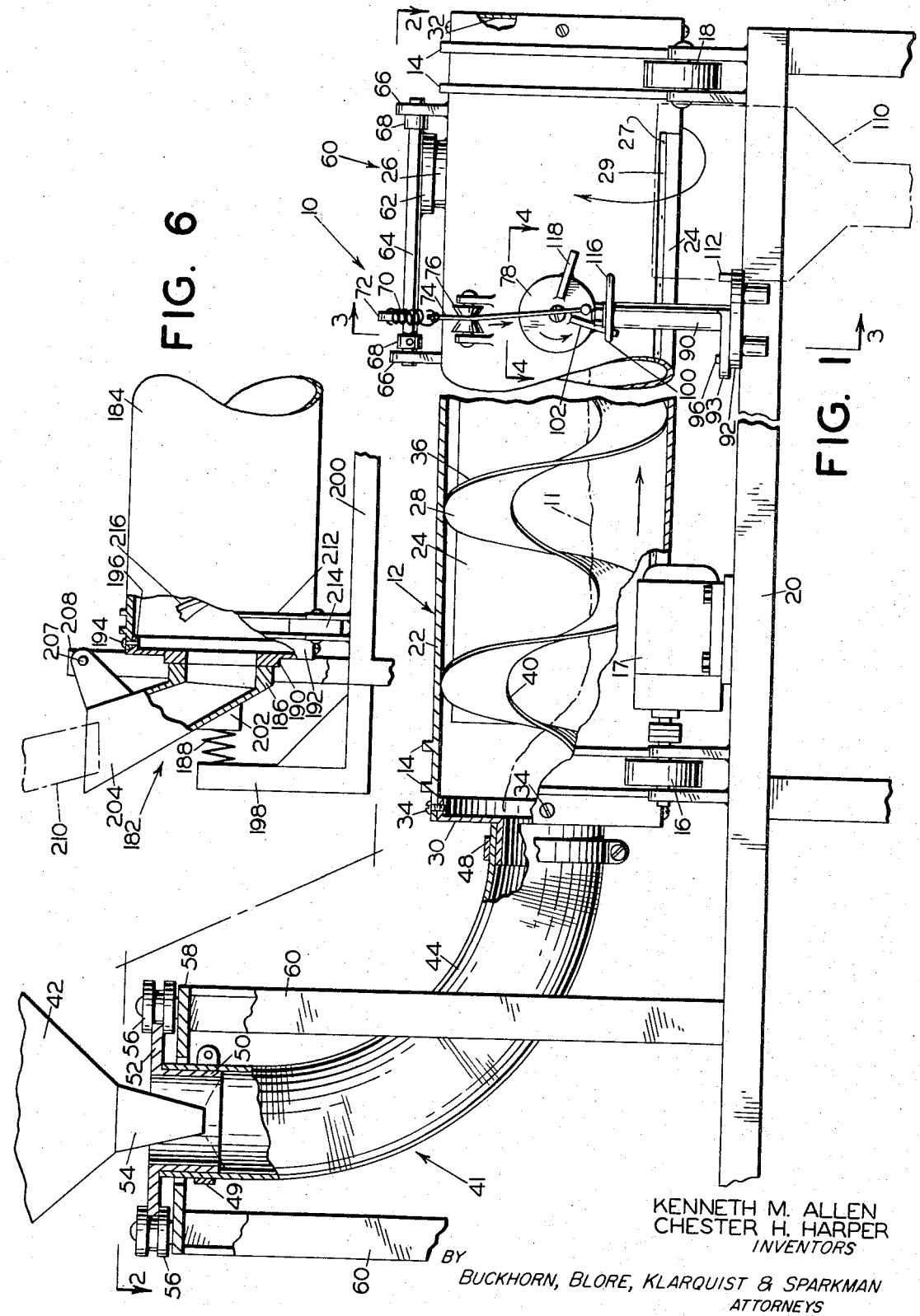
KENNETH M. ALLEN
CHESTER H. HARPER
INVENTORS
BY BUCKHORN, BLORE, KLARQUIST & SPARKMAN
ATTORNEYS Nov. 7, 1967  K. M. ALLEN ETAL  3,351,181
CONVEYORS OF GRANULAR MATERIAL
Filed Dec. 23, 1965
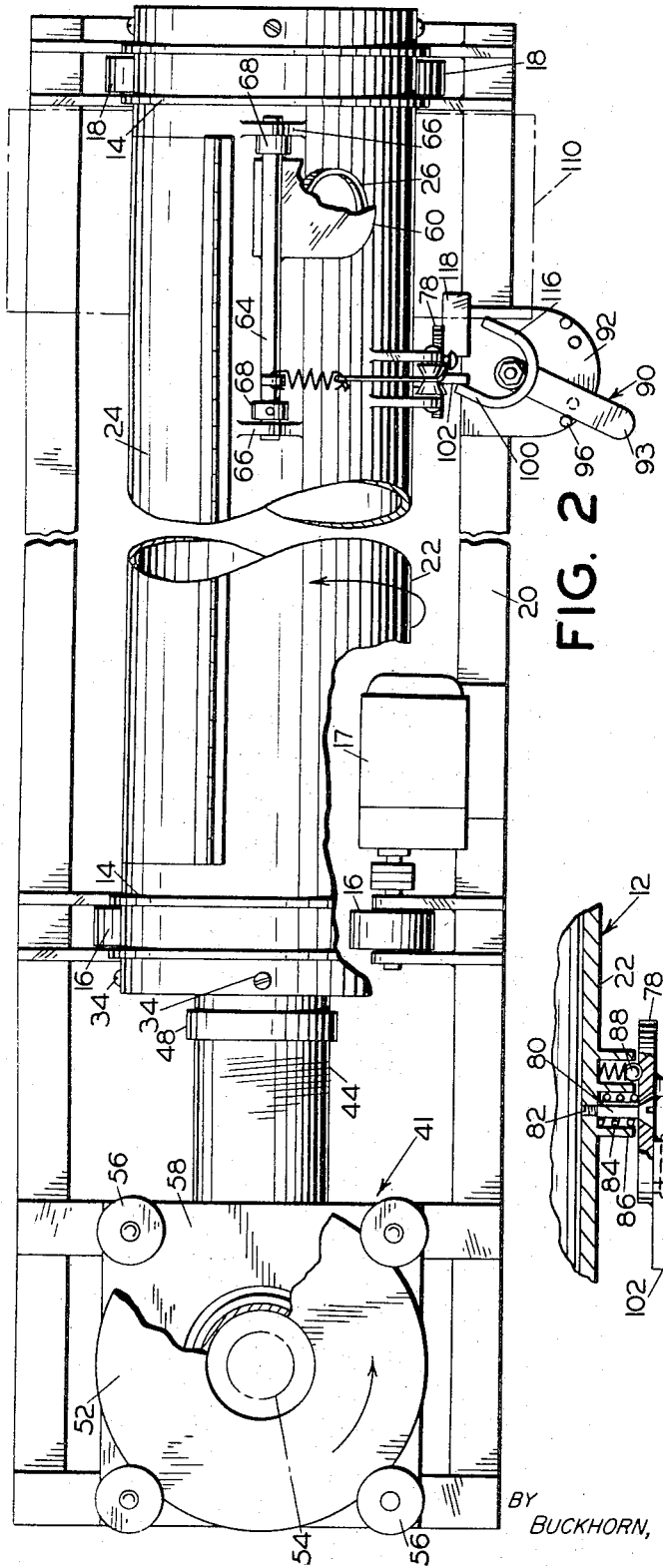
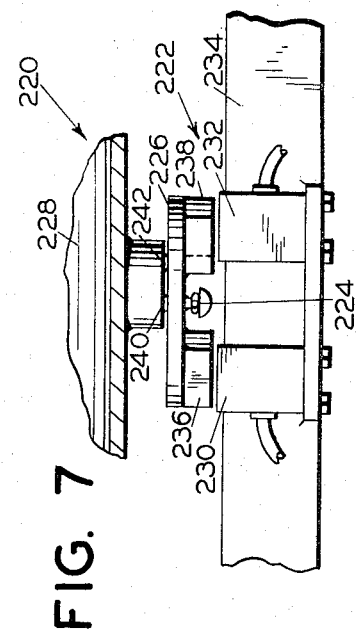
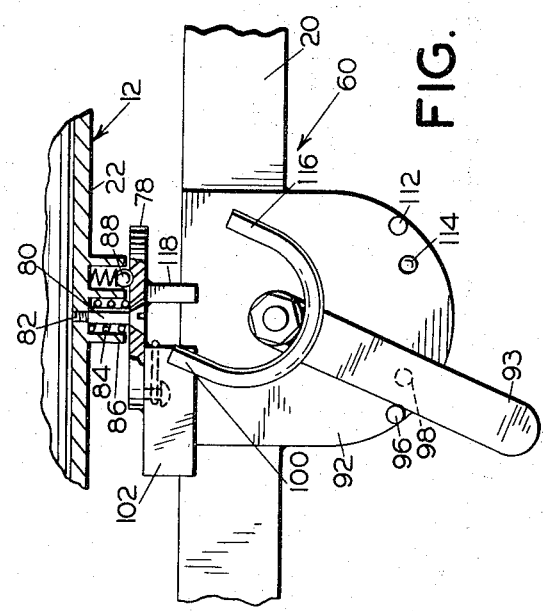
KENNETH M. ALLEN
CHESTER H. HARPER
INVENTORS
BY BUCKHORN, BLORE, KLARQUIST & SPARKMAN
ATTORNEYS Nov. 7, 1967  K. M. ALLEN ETAL  3,351,181
CONVEYORS OF GRANULAR MATERIAL
Filed Dec. 23, 1965  3 Sheets-Sheet 3

KENNETH M. ALLEN
CHESTER H. HARPER
INVENTORS
BY
BUCKHORN, BLORE, KLARQUIST & SPARKMAN
ATTORNEYS

United States Patent Office 3,351,181
Patented Nov. 7, 1967

3,351,181
CONVEYORS OF GRANULAR MATERIAL
Kenneth M. Allen and Chester H. Harper, both of
P.O. Box 352, Newberg, Oreg. 97132
Filed Dec. 23, 1965, Ser. No. 515,954
8 Claims. (Cl. 198—215)

This invention relates to conveyors of granular material, and more particularly to non-packing helical conveyors.

An object of the invention is to provide new and improved conveyors of granular material.

Another object of the invention is to provide non-packing helical conveyors.

A further object of the invention is to provide conveyors which do not overfill.

Another object of the invention is to provide conveyors of granular material having discharge mechanisms which close only while material is not being discharged therefrom so that material is not trapped between closure members thereof.

The invention provides conveyors of granular material including helical ribbons mounted in rotated horizontal or inclined cylinders. In a conveyor forming one embodiment of the invention a door is mounted on the cylinder in a position to open or close a discharge opening thereof, and a door-operating mechanism closes the door only when the discharge opening is on the upper side of the cylinder so that no material is being discharged as the door is closed. The conveyor may include a supply mechanism comprising either a flexible tube rotated with the cylinder and having an upwardly directed end receiving material from a hopper or a non-rotating tube leading from a hopper to the inlet end of the cylinder and sealed to the cylinder by a slip joint. In a conveyor forming an alternate embodiment of the invention, a plurality of angularly extending cylinders rotated in synchronism carrying a plurality of helical ribbons are connected by flexible tubes each secured to the outlet of one cylinder and an inlet of the next cylinder. Preferably the helical ribbons expand radially in the cylinders to tightly engage the inner walls of the cylinders so that the ribbons rotate with the cylinders and can be removed from the cylinders by pulling the ends of the ribbons which extends the ribbons axially and contracts the ribbons radially so that they move inwardly away from the walls of the cylinder.

A complete understanding of the invention may be obtained from the following detailed description of conveyors of granular material forming specific embodiments thereof, when read in conjunction with the appended drawings, in which:

FIG. 1 is a fragmentary, partially sectional, side elevation view of a conveyor of granular material forming one embodiment of the invention;

FIG. 2 is a horizontal sectional view taken substantially along line 2—2 of FIG. 1;

FIG. 4 is an enlarged horizontal sectional view taken substantially along line 4—4 of FIG. 1;

FIG. 6 is a fragmentary side elevation view of a conveyor of granular material forming an alternate embodiment of the invention; and FIG. 7 is a fragmentary, horizontal sectional view of a conveyor of granular material forming an alternate embodiment of the invention.

Figure 3:
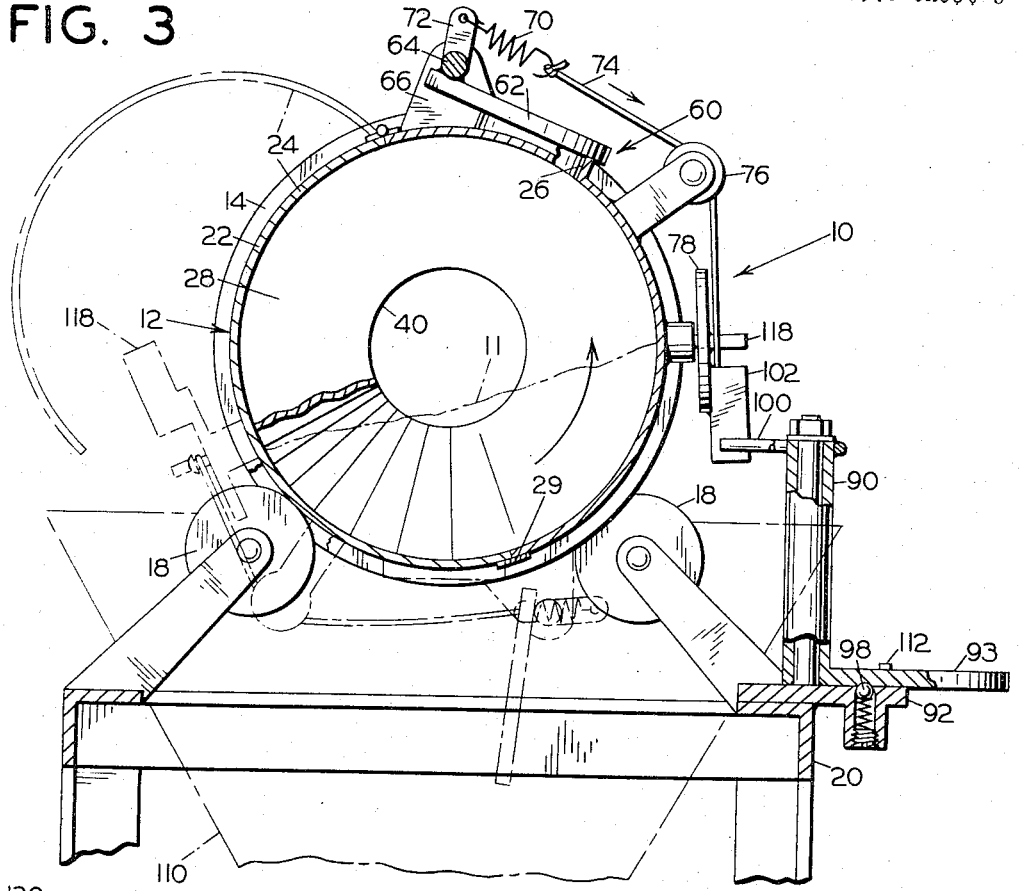
FIG. 3 is a vertical sectional view taken substantially along line 3—3 of FIG. 1.

Referring now in detail to the drawings, a conveyor 10 (FIGS. 1 to 4) is adapted to convey granular material 11 such as, for example, sugar and keep itself filled without packing or jamming the material. The conveyor includes a hollow cylinder 12 having grooved circular tracks 14 (FIGS. 1 to 3) on the end portions thereof which rest on a pair of driving rollers 16 driven by a motor 17 and a pair of idler rollers 18. The rollers and motor are supported on a base frame 20. The cylinder includes an imperforate hollow cylindrical portion 22 having a close-fitting, hinged access door 24 (FIG. 2) for cleaning the interior thereof and a short discharge tube 26. The free edge of the door is detachably secured to the cylinder by screws 27 and a sealing strip 29 welded to the free edge of the door. A helical ribbon 28 of somewhat resilient material such as, for example, stainless steel tends to longitudinally contract itself slightly from the position thereof in the cylinder 12 and abuts an entrance end cap 30 and a closing cap or disc 32 which are removably secured to the cylindrical portion 22 by capscrews 34 (FIG. 1). This tendency of the spiral to contract longitudinally tends to expand the ribbon in the transverse or radial direction and forces outer peripheral edge 36 of the ribbon into tight engagement with the cylindrical portion 22 to hold the ribbon against rotating movement relative to the cylindrical portion 22. The ribbon may be removed easily from the cylinder 12 by removing one of the caps 30 and pulling the ribbon, the pulling of the ribbon serving to extend the ribbon longitudinally which contracts it radially to draw the ribbon inwardly away from the cylindrical portion 22, thereby permitting free axial movement of the ribbon along the cylindrical portion 22. The ribbon may be similarly inserted into the cylindrical portion by opening the door 24 and pulling the ribbon into the cylinder.

As the cylinder 12 is rotated by the drive rollers 16 in a counterclockwise direction, as viewed in FIG. 3, the material 11 continuously slides down the lower righthand portion of the cylindrical portion 22 and is pushed continuously toward the right, as viewed in FIG. 1, by the ribbon 28. The material will fill the lower portion of the cylinder but never packs or jams therein since excess material will slip over inner periphery 40 of the ribbon and prevent filling of the cylinder beyond the level of the material therein shown in FIGS. 1 and 3. The material is continuously supplied to the cylinder 12 and ribbon 28 to keep them filled to their capacity by a supplier 41 including a hopper 42 and a corrugated flexible tube 44 clamped at its lower end by a band 46 to a tube 48 of the cap 30 and clamped at its upper end by a band 49 to a tube 50 of a disc 52. A tapered discharge spout 54 of the hopper extends into the tube 50 to supply the material 11 up to the level shown in FIG. 1. The disc 52 is mounted for free rotation on a vertical axis by grooved rollers 56 mounted rotatably on an apertured plate 58 carried by posts 60 of the frame 20. As the cylinder 12 is rotated, it rotates the flexible tube 44 and the disc 52, the tube 44 flexing. The tube 44 forms a completely sealed, angular, rotating connection between the hopper 42 and the cylinder 12 without the necessity of a slip joint.

To discharge the material 11 from the cylinder 12, there is provided a discharge mechanism 60 (FIGS. 1 to 4) including the short discharge tube 26 and a door 62 carried by a shaft 64 journaled in lugs 66 welded to the cylinder 12, collars 68 on the shaft limiting endwise movement of the shaft. The door 62 is held in its closed position by a tension spring 70 connected to an arm 72 rigid with the shaft 64 and a strand 74 passing over pulley 76 and secured eccentrically to crank disc 78, when the disc 78 is in the position thereof shown in FIGS. 1 to 3 of the drawings. The disc 78 is pivotally mounted on a pin 80 (FIG. 4) screwed into tapped bore 82 in the cylindrical portion 22 of the cylinder 12. A spring 84 urges the crank disc away from a boss 86, and a spring-pressed detent 88 holds the crank disc either in the position shown in FIG. 1 in which the door 62 is closed or in the position of the crank disc shown in FIG. 4 in which the door 62 is free to open by gravity each time it is revolved about the lower portion of the cylinder 12. To close the door 62 only when the discharge tube 26 is directed upwardly so that none of the material 11 is being discharged while the door is closed, a forked actuator 90 pivoted on a pin 91 carried by a plate 92 secured to the frame 20 is moved manually to a handle 93 to the position thereof shown in FIG. 4 in which a handle 94 engages a stop 96 and is held in this position by a detent 98 and an arm 100 is in the path of a radial plate 102 on the crank disc 78. Then, as the disc 78 is moved past the arm 100, the tube 26 (FIG. 1) being near the top of the cylinder 12 and directed upwardly, the crank disc 102 engages the arm 100 and is swung counterclockwise to the position thereof shown in FIG. 1. This tensions the strand 74 to close the door 62, and the detent 88 (FIG. 4) holds the crank disc 102 in this position. To open the door 62 to cause the material to be discharged from the discharge tube 26 into a receiving chute 110 (FIGS. 1 and 3), the handle is swung to a position engaging a stop 112 and engaged by a detent 114 (FIG. 4). This positions an arm 116 of the actuator 90 in the path of a radial plate 118 on the crank disc, and the plate 118 engages the arm 116 and is swung with the crank disc clockwise from the positions thereof shown in FIG. 1 to the positions thereof shown in FIG. 4 in which sufficient slack is provided in the strand 74 to permit the door 62 to open to the desired extent. A detent (not shown) prevents movement of the crank disc on beyond its position shown in FIG. 4 and holds the crank disc against accidental movement from that position. Also, the positions of the end of the strand 74 connected to the crank disc are overcenter relative to the crank disc in both extreme positions of the crank disc so that tension on the strand tends to hold the crank disc either in its one extreme position holding the door 62 closed or its other extreme position permitting the door to open. While only one discharge tube 26 and discharge mechanism 60 are shown, others can be provided along the length of the cylinder 12, the cylinder 12 being as long as desired.

Figure 5:
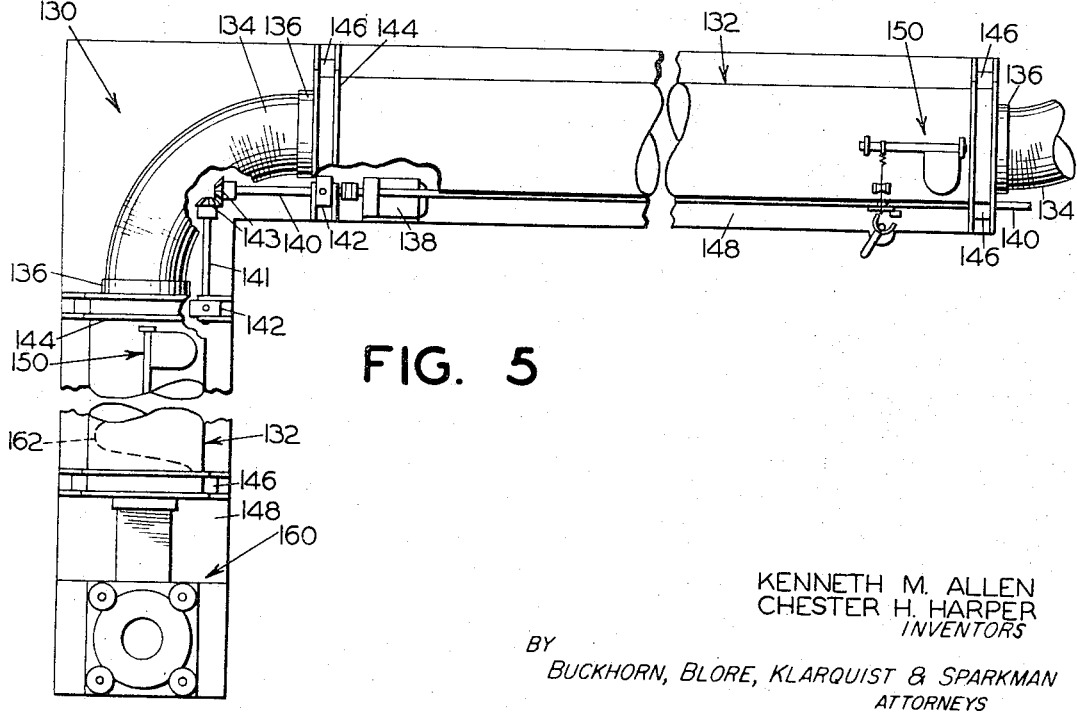
FIG. 5 is a top plan view of a conveyor of granular material forming an alternate embodiment of the invention.

*Embodiment of FIG. 5*

A conveyor 130 of granular materials forming an alternate embodiment of the invention is adapted to convey granular materials along an angular path. The conveyor 130 includes cylinders 132 like the cylinder 12 and connected in tandem with each other by flexible conduits 134 secured to end caps 136 and rotated by a motor 138, shafts 140 and 141 and rollers 142 driving annular tracks 144. Idler rollers 146 on base frames 148 also support the cylinders. Individual discharge mechanisms 150 like the discharge mechanism 60 are provided on the cylinders 12 for selectively discharging the materials as desired. A supplier 160 like the supplier 41 (FIG. 1) is adapted to supply the granular material to the first cylinder 132 as needed with a gentle urging, and the first cylinder moves the material therethrough and pushes it gently through the flexible conduit 134 attached thereto which is axially aligned at one end with the cylinder and is of a larger diameter than the inner periphery of a helical ribbon 162 in the cylinder 132 so that the ribbon pushes the material through the conduit 134 to the next cylinder 132. If desired, each cylinder 132 can be inclined upwardly somewhat toward its discharge end and the entrance end of each succeeding cylinder 132 be positioned lower than the discharge end of the preceding cylinder to aid the flow of the material by gravity.

*Embodiment of FIG. 6*

A conveyor 180 for conveying granular materials and forming an alternate embodiment of the invention is similar to the conveyor 10 (FIG. 1) but includes a non-rotating supplier 182 (FIG. 6) connected to a cylinder 184 like the cylinder 12 by a thick ring 186 pressed by a compression spring 188 against a thick ring 190 of an end cap 192 secured to the cylinder 184 by cap screws 194 screwed into annular flange 196, the cap 192 abutting the end of the cylinder. The spring 188 seats in sockets in an abutment 198 forming a part of base frame 200 and a boss 202 of a tapered or funnel-like member 204 also carrying the ring 186 at its lower end. The member 204 has a lug 206 pivotally mounted loosely on a pin 207 carried by a post 208 of the frame 200. A hopper 210 keeps the member 204 filled with the granular material which flows into the cylinder 184. The cylinder 104 is mounted for rotation and held against endwise movement by grooved annular tracks 212 into which project pairs of rollers 214 carried by the frame, one of the rollers being driven by an electric motor (not shown). The ring 186 is pressed tightly into sealing engagement with the ring 190 to form an effective seal therewith as the cylinder 184 and a helical ribbon 216 therein are rotated to advance the granular material to the right, as viewed in FIG. 6.

*Embodiment of FIG. 7*

A conveyor 220 forming an alternate embodiment of the invention is identical to the conveyor 10 except that the conveyor 220 has a remote controlled, magnetic actuator 222 for latching and unlatching a door (not shown) like the door 62 (FIG. 1) through a strand 224 (FIG. 7) like the strand 74 (FIG. 1). The strand 224 (FIG. 7) is secured eccentrically to a crank disc 226 mounted on a cylinder 228 corresponding to the cylinder 12 (FIG. 1), and a pair of remote controlled, electromagnets 230 and 232 are mounted on a base frame 234 in fixed positions thereon. The electromagnets 230 and 232 are mounted in positions adjacent the paths of arcuate armatures 236 and 238, respectively, fixed to the disc 226, as the crank disc is revolved by the cylinder 228 about the axis of rotation of the cylinder. When the electromagnet 230 is energized and as the armature 236 is moved therepast, the electromagnet applies a sufficient restraining force on the armature 236 to turn the crank disc 226 on a pin 240 to its latching position as limited and held by a detent 242, and the door is closed while it is in a position above the cylinder 228. When the electromagnet 232 is energized and the armature 238 is revolved therepast, movement of the armature is resisted with sufficient force to turn the crank disc to its unlatching position, the detent 242 limiting movement in this direction and holding the disc in this position.

The above-described conveyors 10, 130, 182 and 220 serve to effectively convey granular material gently and without packing even though the conveyors are operated for long periods of time without any material being drawn therefrom. The doors of the discharge mechanisms are closed only while in positions above the cylinders in which material is not being discharged therefrom, which prevents material from being trapped between the doors and the ends of the discharge tubes, which are effectively sealed by the doors. The conveyors can be inclined to raise or lower the material and require only small motors for driving them.

It is to be understood that the above-described arrangements are simply illustrative of the application of the principles of the invention. Numerous other arrangements may be readily devised by those skilled in the art which will embody the principles of the invention and fall within the spirit and scope therof.

What is claimed is:
1. In a conveyor of granular material,
   a plurality of cylinders,
   mounting means mounting the cylinders in tandem and in non-vertical positions in which the cylinders are spaced longitudinally from each other and angularly relative to each other,
   a plurality of helical ribbons in the cylinders and held against rotation relative to the cylinders, flexible conduit means connecting the adjacent ends of the cylinders, drive means for rotating the cylinders on the longitudinal axes in a direction in which the ribbons push granular material in the cylinders along the cylinders and through the flexible conduit means, supply means for supplying granular material to an end one of the cylinders, and a plurality of mechanisms carried by the cylinders for discharging granular material laterally from the cylinders.

2. In a conveyor of granular material, cylinder means having an entrance end portion and a second end portion, an inlet tube coupled to and keyed to the entrance end portion of the cylinder means so that the tube is rotatable with the cylinder means, mounting means mounting the cylinder means for rotation on a non-vertical axis, a helical ribbon in the cylinder means and held against rotation relative to the cylinder, drive means for rotating the cylinder means and the ribbon on the longitudinal axis thereof in a direction in which the ribbon pushes granular material in the cylinder means along the cylinder means toward the second end portion thereof, supply means for supplying granular material to the entrance end portion of the cylinder means, the supply means including a flexible conduit fixed at one end to the inlet tube and rotatable therewith, bearing means journaling the other end of the conduit in an upwardly directed position and means for supplying granular material to said other end of the conduit, and a discharge mechanism carried by the cylinder means for discharging granular material from the cylinder means.

3. The conveyor of claim 2 wherein the bearing means includes an annular disc, a plurality of grooved rollers mounting the disc rotatably and means securing the conduit to the disc.

4. The conveyor of claim 2 wherein the discharge mechanism includes tubular discharge means mounted in the side of the cylinder means, a door mounted on the cylinder means for movement between a closed position and an open position relative to the tube, tripping means movable between a first position and a second position and mounted adjacent the cylinder means and past which the cylinder means is rotated, pivotal means carried by the cylinder means in a position adapted to move past and engage and be moved by the tripping means as the door is in a position above the cylinder, and coupling means drivingly connecting the pivotal means and the door.

5. The conveyor of claim 4 wherein the tripping means includes a forked member having a first arm and a second arm, and the pivotal means includes a crank disc pivotal on the cylindrical means and driving the coupling means, a first radial plate thereon adapted to engage the first arm when the tripping means is in the first position and turn the crank disc to a position closing the door, and a second radial arm adapted to engage the second arm and turn the crank disc to a position permitting the door to open.

6. In a conveyor of granular material, cylinder means having an entrance end portion and a second end portion and including a radially inwardly positioned annular end member at the entrance end portion having center, exterior bearing portion, mounting means mounting the cylinder means for rotation on a non-vertical axis, a helical ribbon in the cylinder means and held against rotation relative to the cylinder, drive means for rotating the cylinder means and the ribbon on the longitudinal axis thereof in a direction in which the ribbon pushes granular material in the cylinder means along the cylinder means toward the second end portion thereof, supply means for supplying granular material to the entrance end portion of the cylinder means including a sloping tubular member having an open entrance end and a thick bearing ring at the lower end thereof, means pressing the ring against a bearing portion of the annular end member to seal the members together and permit relative rotation therebetween, and a discharge mechanism carried by the cylinder means for discharging granular material from the cylinder means.

7. In a conveyor of granular material, a cylinder means having an entrance end portion and a second end portion, mounting means mounting the cylinder means for rotation on a non-vertical axis, feed means in the cylinder means and held against rotation relative to the cylinder for advancing material along the cylinder means, drive means for rotating the cylinder means and the feed means on the longitudinal axis thereof in a direction in which the feed means pushes granular material in the cylinder means along the cylinder means toward the second end portion thereof, supply means for supplying granular material to the entrance end portion of the cylinder means, tubular discharge means mounted in the side of the cylinder means, a door mounted on the cylinder means for movement between a closed position and an open position relative to the tube, tripping means movable between a first position and a second position and mounted adjacent the cylinder means and past which the cylinder means is rotated, pivotal means carried by the cylinder means in a position adapted to move past and engage and be moved by the tripping means as the door is in a position above the cylinder, and coupling means drivingly connecting the pivotal means and the door.

8. The conveyor of claim 7 wherein the tripping means includes a forked member having a first arm and a second arm, and the pivotal means includes a crank disc pivotal on the cylindrical means and driving the coupling means, a first radial plate thereon adapted to engage the first arm when the tripping means is in the first position and turn the crank disc to a position closing the door, and a second radial arm adapted to engage the second arm and turn the crank disc to a position permitting the door to open.

References Cited

UNITED STATES PATENTS

| 1,914,462 | 6/1933 | Ronne | 263—32 |
| 2,665,796 | 1/1954 | Anderson | 198—215 |
| 3,092,241 | 6/1963 | Dubie | 198—213 |

FOREIGN PATENTS

| 492,994 | 3/1930 | Germany. |

EVON C. BLUNK, *Primary Examiner.*

RICHARD E. AEGERTER, *Assistant Examiner.*